US012596577B2

(12) United States Patent
Sen et al.

(10) Patent No.: US 12,596,577 B2
(45) Date of Patent: Apr. 7, 2026

(54) RESOURCE PROVISIONING

(71) Applicant: Microsoft Technology Licensing, LLC, Redmond, WA (US)

(72) Inventors: Rathijit Sen, Redmond, WA (US); Matteo Interlandi, Torrance, CA (US); Jiashen Cao, Roswell, GA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 553 days.

(21) Appl. No.: 18/161,679

(22) Filed: Jan. 30, 2023

(65) Prior Publication Data

US 2024/0126604 A1 Apr. 18, 2024

Related U.S. Application Data

(60) Provisional application No. 63/379,485, filed on Oct. 14, 2022.

(51) Int. Cl.
*G06F 9/50* (2006.01)

(52) U.S. Cl.
CPC ............ *G06F 9/5016* (2013.01); *G06F 9/505* (2013.01)

(58) Field of Classification Search
CPC .................................................... G06F 9/5016
See application file for complete search history.

(56) References Cited

U.S. PATENT DOCUMENTS

2016/0050126 A1* 2/2016 Rubio ................ H04N 1/00344
709/226
2023/0393919 A1* 12/2023 Nigudkar ............ G06F 11/0709

OTHER PUBLICATIONS

"Multi-Process Service", Retrieved From: https://docs.nvidia.com/deploy/mps/index.html, Oct. 3, 2022, 37 Pages.
"Nsight Compute", Retrieved From: https://docs.nvidia.com/nsight-compute/2022.2/NsightCompute/index.html, May 2022, 78 Pages.
"Nvidia A100 Tensor Core GPU", Retrieved From: https://www.nvidia.com/en-us/data-center/a100/, May 2022, 3 Pages.
"Nvidia Multi-Instance GPU User Guide", Retrieved From: https://docs.nvidia.com/datacenter/tesla/mig-user-guide/index.html, Nov. 23, 2022, 55 Pages.
"User Guide", Retrieved From: https://docs.nvidia.com/nsight-systems/UserGuide/index.html, Nov. 14, 2022, 301 Pages.

(Continued)

*Primary Examiner* — Charlie Sun
(74) *Attorney, Agent, or Firm* — Holzer Patel Drennan

(57) ABSTRACT

A system provisioning resources of a processing unit. The system predicts a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit. The system determines a resource allocation of the processing unit, based on the predicted performance impact and instructs the processing unit to allocate the resources for processing the workload based on the determined resource allocation.

20 Claims, 10 Drawing Sheets

(56)            References Cited

OTHER PUBLICATIONS

Hong, et al., "An Analytical Model For a GPU Architecture With Memory-Level And Thread-Level Parallelism awareness", In Proceedings of the 36th Annual International Symposium on Computer Architecture, Jun. 20, 2009, pp. 152-163.

O'Neil, et al., "The Star Schema Benchmark and Augmented Fact Table Indexing", In Proceedings of Technology Conference on Performance Evaluation and Benchmarking, Jun. 5, 2009, pp. 237-252.

Shanbhag, et al., "A Study of the Fundamental Performance Characteristics of GPUs and CPUs for Database analytics", In Proceedings of ACM SIGMOD International Conference on Management of Data, May 31, 2020, pp. 1617-1632.

Suhan, "HeavyDB", Retrieved From: https://github.com/heavyai/heavydb, Dec. 14, 2022, 13 Pages.

Wang, et al., "A Hybrid Framework for Fast and Accurate GPU Performance Estimation Through Source-Level analysis and trace-based simulation", In Proceedings of IEEE International Symposium on High Performance Computer Architecture, Mar. 28, 2019, pp. 506-518.

Williams, et al., "Roofline: An Insightful Visual Performance Model for Multicore Architectures", In Journal of Communications of the ACM, vol. 52, Issue 4, May 26, 2014, pp. 65-76.

Zhang, et al., "A Quantitative Performance Analysis Model for GPU Architectures", In Proceedings of IEEE 17th International Symposium on High Performance Computer Architecture, Apr. 15, 2011, pp. 382-393.

Cao, et al., "Revisiting Query Performance in GPU Database Systems", In Repository of arXiv:2302.00734v1, Feb. 1, 2023, 13 Pages.

Li, et al., "MISO: Exploiting Multi-Instance GPU Capability on Multi-Tenant Systems for Machine Learning", In Repository of arXiv:2207.11428v3, Oct. 6, 2022, 14 Pages.

International Search Report and Written Opinion received for PCT Application No. PCT/US2023/031781, Jan. 17, 2024, 14 pages.

Konstantinidis, et al., "A quantitative roofline model for GPU kernel performance estimation using micro-benchmarks and hardware metric profiling", Journal of Parallel and Distributed Computing, vol. 107, Sep. 1, 2017, pp. 37-56.

Lopes, et al., "Exploring GPU performance, power and energy-efficiency bounds with Cache-aware Roofline Modeling", IEEE International Symposium on Performance Analysis of Systems and Software (ISPASS), Apr. 24, 2017, pp. 259-268.

Werkhoven, et al., "Lessons Learned in a Decade of Research Software Engineering GPU Applications", In International Conference on Computational Science, 2020, pp. 399-412.

Werkhoven, et al., "Performance Models for CPU-GPU Data Transfers", 14th IEEE/ACM International Symposium on Cluster, Cloud and Grid Computing, IEEE, May 26, 2014, pp. 11-20.

Wu, et al., "GPGPU performance and power estimation using machine learning", 21st International Symposium on High Performance Computer Architecture, (HPCA), IEEE, Feb. 7, 2015, pp. 564-576.

International Preliminary Report on Patentability received for PCT Application No. PCT/US23/031781, Apr. 24, 2025, 08 pages.

* cited by examiner

100

Graphical Processing
Unit(s)
112

Resource
Provisioning
Instructions
116

Query
104

Query
104

Communication
Interface
106

Resource Provisioner
108

Performance
Analyzer
118

Resource
Manager
120

Central Processing
Unit(s)
110

Model Respository
114

Computing Device
102

500
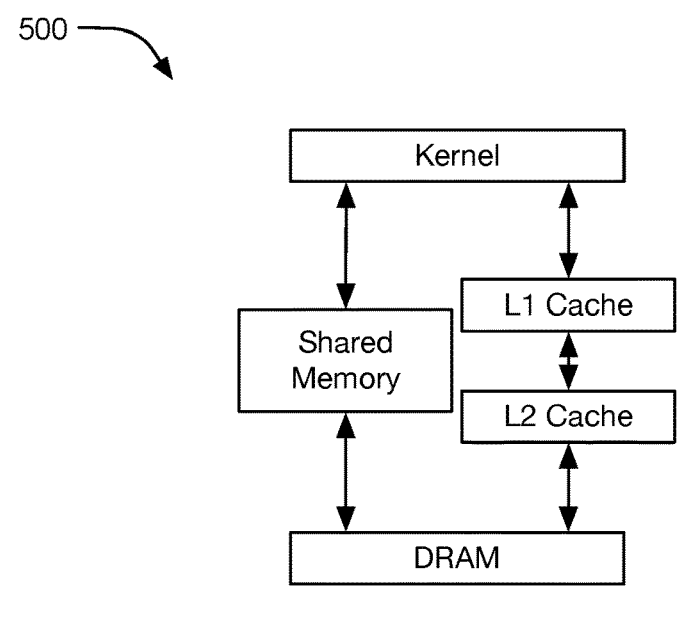
502                     504
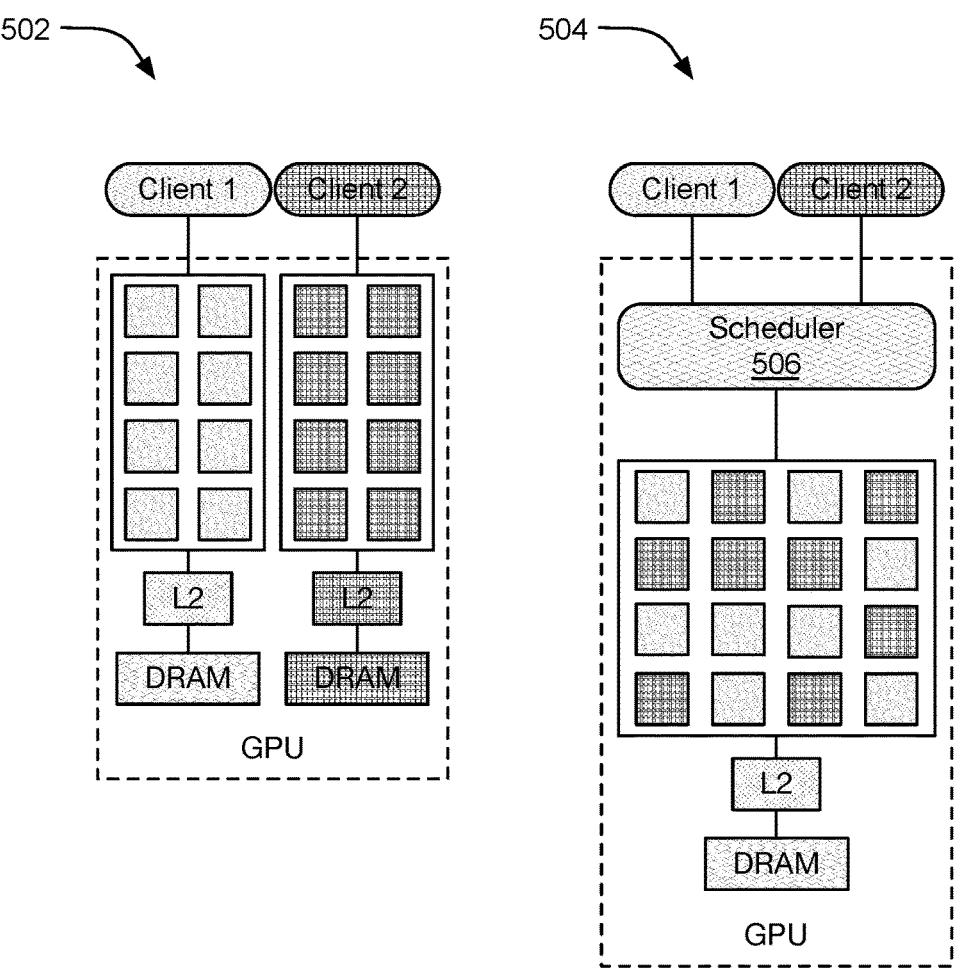
FIG. 5

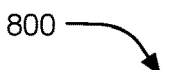

800

Receive a workload that can have one or more queries
802

Receive a resource model that characterizes attainable compute/memory bandwidth and arithmetic intensity based on peak compute bandwidth and peak memory bandwidth of the processing unit
804

Predict a performance impact on execution of the workload attributable to a performance constraint of the processing unit for the workload according to the resource model
806

Determining a resource allocation of the processing unit, based on the predicted performance impact
808

Instruct the processing unit to allocate the resources for processing the workload based on the determined resource allocation
810

Execute the workload in the processing unit according to the determined workload allocation
812

FIG. 8

RESOURCE PROVISIONING

CROSS-REFERENCE TO RELATED APPLICATIONS

The present application claims benefit of priority to U.S. Provisional Patent Application No. 63/379,485, entitled "Resource Provisioning" and filed on Oct. 14, 2022, which is specifically incorporated by reference for all that discloses and teaches.

BACKGROUND

Graphics Processing Units (GPUs), with their potential for massively parallel computing, high-bandwidth memory access capability, and relative ease of programming for an accelerator, have seen rising interest in their use for accelerating data analytics, with a number of GPU database systems being developed in both academic and industrial settings in recent years.

SUMMARY

In some aspects, the techniques described herein relate to a method of provisioning resources of a processing unit, the method including: predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; determining a resource allocation of the processing unit, based on the predicted performance impact; and instructing the processing unit to allocate the resources for processing the workload based on the determined resource allocation.

In some aspects, the techniques described herein relate to a system for provisioning resources of a processing unit, the system including: one or more hardware processors; a performance analyzer executable by the one or more hardware processors and configured to predict a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; and a resource manager executable by the one or more hardware processor and configured to determine a resource allocation of the processing unit, based on the predicted performance impact and to instruct the processing unit to allocate the resources for processing the workload based on the determined resource allocation.

In some aspects, the techniques described herein relate to one or more tangible processor-readable storage media embodied with instructions for executing on one or more processors and circuits of a computing device a process for provisioning resources of a processing unit, the process including: predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; determining a resource allocation of the processing unit, based on the predicted performance impact; and instructing the processing unit to allocate the resources for processing the workload based on the determined resource allocation.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTION OF THE DRAWINGS

FIG. 5 illustrates an example memory hierarchy that may be employed in executing workloads, an example multi-instance GPU, and an example multi-process service.

FIG. 8 illustrates example operations for provisioning resources of a processing unit.

DETAILED DESCRIPTIONS

Figure 1:
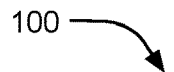
FIG. 1 illustrates an example resource provisioning system in a computing device 102.

Advances in interconnect protocols and architectural enhancements have made GPUs more attractive as accelerators for data analytics. It is expected that the popularity of GPU database systems and a proliferation of research into their efficient designs will continue.

Query performance depends on query characteristics and input data sizes, and the same query can have different performances with different GPU database systems and on different GPUs. A good understanding of GPU resource utilization and bottlenecks encountered can assist in designing systems that effectively use the available hardware resources.

Over the years, GPUs have become more powerful with increased resources for compute, memory capacity, and bandwidths. Capabilities for supporting concurrent kernel execution through partial or full partitioning of GPU resources offer users opportunities for scheduling their workloads and allocating resources to balance cost for performance according to their business needs. The relative cost is the fraction of total GPU resources allocated, and the performance is also relative to that with full allocation. The performance impact varies with the resource allocation as well as the scale factor (SF) relating to input data size. For example, running with half GPU resources results in 54.5% performance loss for SF=64 in contrast to only 5.4% for SF=16. The trade-offs would be different for other queries.

However, while GPUs allow numerous possible resource allocations, there is no easy way to select the right allocation for a workload. In a simple approach, a user would have to run a multitude of representative workloads with different allocations and then choose the most suitable configuration, which would likely present an impractical, time-consuming, and costly process. In contrast, the described technology leverages and adapts a model, such as a popular bottleneck analysis and visualization framework called a "roofline" model, to automatically present users with estimates about cost-performance trade-offs that can lead to informed decisions about resource allocations. The roofline model, for example, reveals that database queries often underutilize GPU resources. Thus, there exists a previously unrealized technical benefit to improve overall GPU utilization and workload performance, e.g., speed-ups of up to doubling (and more than doubling) performance, by supporting concurrent query executions with model-based resource allocations in the GPU. In one implementation, results have been obtained using 7-way concurrency, exhibiting a 6.43 times increase in performance.

The described technology may be applied to various GPU database systems, including without limitation:

Crystal, a highly optimized academic prototype but with limited coverage (i.e., only certain queries are supported);

HeavyDB, a GPU database supporting several classes of queries;

BlazingSQL, another GPU database system supporting several classes of queries;

TQP, a general purpose GPU database system using the PyTorch framework as its backend for executing relational operations; and PG-Strom, an execution to the existing PostgreSQL database system to support offloading of operations to the GPU.

Some, but not all, GPU-based database systems can benefit from both query optimization and query compilation phase. After query optimization, in one implementation, a query plan is compiled, and the physical execution of GPU code is optimized. Specifically, such implementation can leverage a GPU cost model allowing the GPU execution mode to become part of the query optimization phase. Based on relative GPU-performance costs, an optimizer can determine whether the operators should be offloaded to GPU. This approach depends on the system to have a good estimate of the cost of each operator in the query plan.

FIG. 1 illustrates an example resource provisioning system 100 in a computing device 102. The computing device 102 may be or include a simple workstation or laptop, a mobile computing device, a computing device within a datacenter, a robust IoT (Internet of Things) device, or any other type of computing device.

A query 104 (such as a database query) is received at the computing device 102 via a communication interface 106, such as a graphical-user-interface, a network interface, or an I/O port, which passes the query 104 to a resource provisioner 108, which may include a performance analyzer 118, a resource manager 120, an optimizer, a resource scheduler, and other components executable by a hardware processor. The query may be received in a workload that includes one or more queries targeted for execution by the computing device 102. In an implementation, the resource provisioner is executable by one or more processing units, such as central processing unit(s) 110, to determine an allocation of resources in another processing unit, such as graphics processing unit 112, that is selected to execute the query 104. Example resources to be allocated in such a processing unit may include without limitation processor cores, dynamic random access memory (DRAM), L1 cache memory, L2 cache memory, integer/floating point arithmetic logic units (ALUs), and tensor cores.

The resource provisioner 108 may include or work in combination with a resource scheduler (not shown) that determines whether the query 104 should be assigned for execution to the central processing unit(s) 110 or the graphics processing unit 112. In some implementations, the resource scheduler is termed a "query optimizer." In one implementation, the query optimizer may employ a rule-based approach. In another implementation, the query optimizer may employ a cost-based approach. The resource modeling of the described technology may be used in a cost-based approach, although it may also be used in other approaches.

If the resource scheduler determines that the query 104 should be executed by the graphics processing unit 112, the resource provisioner 108 consults a model repository 114 to determine a resource allocation instruction 116 to configure the graphics processing unit 112 in processing the query 104. In one implementation, the performance analyzer 118 is executable by one or more hardware processors and is configured to predict a performance impact on a workload attributable to a performance constraint of the processing unit for the workload according to a resource model. The resource model characterizes attainable compute bandwidth, attainable memory bandwidth, and arithmetic intensity based on the peak compute bandwidth and the peak memory bandwidth of the processing unit. The resource manager 120 is executable by the one or more hardware processors and is configured to determine a resource allocation of the processing unit, based on the predicted performance impact and to instruct the processing unit to allocate the resources for processing the workload based on the determined resource allocation.

In one implementation, the resource provisioner 108 sends the resource allocation instruction 116 and the query 104 to the graphics processing unit 112 for execution in accordance with the resource allocation instruction 116. In another implementation, the query 104 may be passed to the graphics processing unit 112 by another component of the computing device 102, such as the communication interface 106. The graphics processing unit 112 configures its resources according to the resource allocation instruction 116 and executes the query 104.

Figure 2:
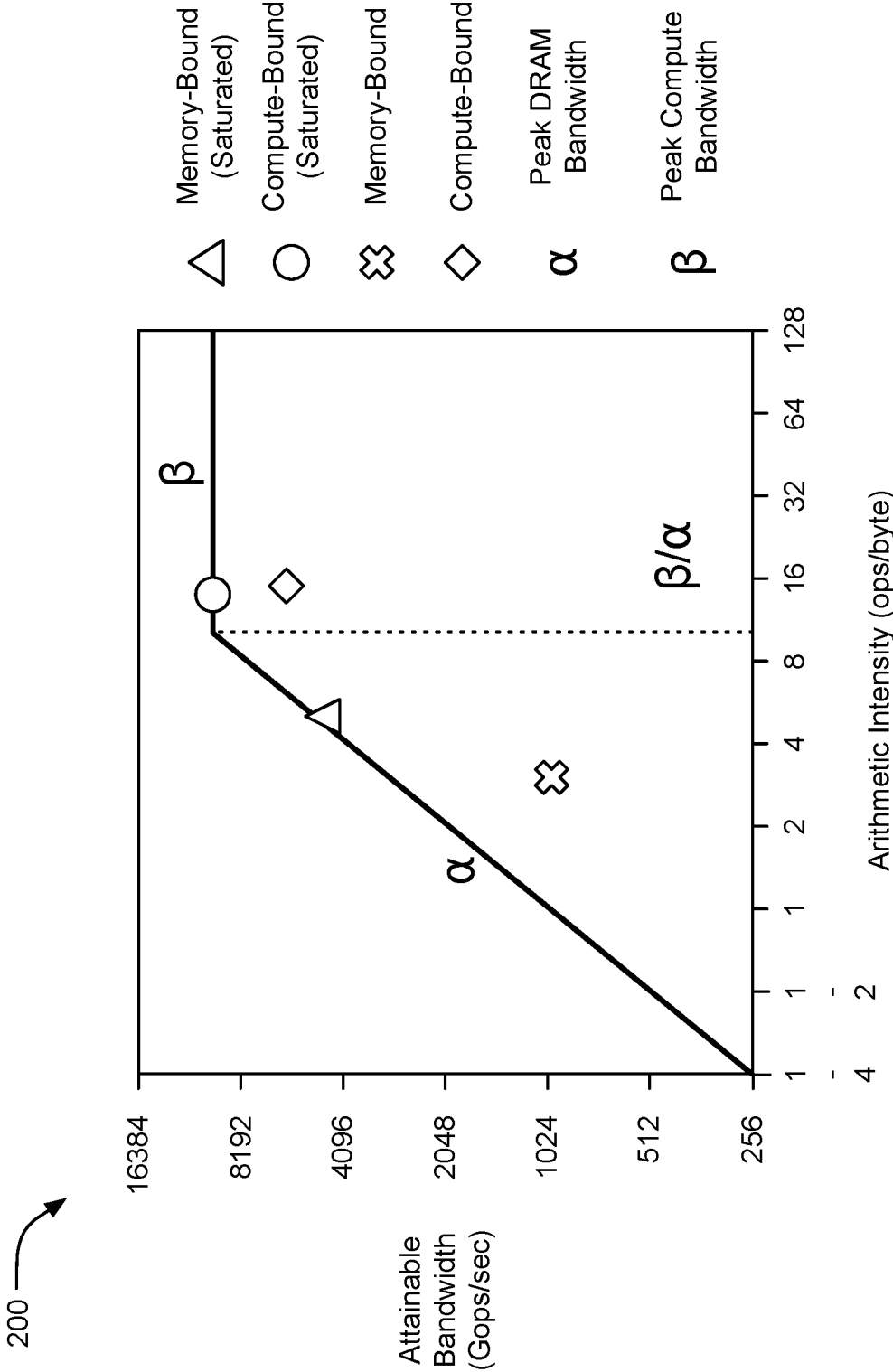
FIG. 2 illustrates an example roofline model applied to resource allocation in a processing unit.

FIG. 2 illustrates an example roofline model 200 applied to resource allocation in a processing unit. Generally, a roofline model is a type of resource model (also referred to as a performance model) for estimating system performance of a given compute kernel, application, or process running on multi-core, many-core, or accelerator processor architectures by showing inherent hardware limitations. Such a resource model can also predict potential benefits and priorities of optimization. In one implementation, a roofline model can be visualized by plotting floating-point performance as a function of machine peak performance, machine peak bandwidth, and arithmetic intensity. The resultant curve is effectively a performance bound under which kernel, application, or process performance resides and includes two platform-specific performance ceilings: a ceiling derived from the memory bandwidth and another derived from the processors' peak compute performance. One or more of the axes tends to be in logarithmic scale.

As described herein, the performance of a processing unit, such as the graphics processing unit 112, for different queries and/or different classifications of queries can be modeled. In one implementation, the roofline model 200 is employed, although other models may be used, such as machine learning (ML) models (e.g., a tree-based machine learning model). Example features of the ML model may include without limitation GPU resource allocation, workload properties, GPU resource utilization, and resource performance obtained from GPU performance counters. The roofline model 200 assumes that any execution in specific hardware is bounded either by its memory (e.g., DRAM, L1 cache memory, L2 cache memory), its computation resource, or some other resource. For ML model implementations, the ML model can be trained on profiling data from previous query executions of a training workload. To select the GPU resource allocation for a training query or workload, the ML model can be trained based on known run time labels for the training query or workload based on different GPU resource allocations. Accordingly, the ML model can predict the run time label for unlabeled queries/workloads.

Visually, as seen in FIG. 2, the roofline model 200 includes two lines to indicate its peak memory bandwidth (the sloping line α) and its peak compute bandwidth (the flat line β). Query executions on this particular processing unit will correspond to points within the space bounded by these lines, so those two lines are considered the performance ceilings for that processing unit. The X-axis represents the arithmetic intensity (AI), calculated as the total number of operations (e.g., integer or floating-point operations) divided by the total number of bytes read for an execution. The Y-axis indicates the achieved throughput, calculated as the executed operations per second.

A query execution may be memory bound $$\left(e.g., AI < \frac{\beta}{\alpha}\right),$$

or compute bound. Bounded executions are impacted by changes in the allocation of the corresponding resource (e.g., memory-bound (saturated) or compute-bound (saturated) in FIG. 2). Algorithmic or compiler inefficiencies will increase the AI and make an otherwise memory-bound execution non-bound, with the query taking longer to complete. However, as will be shown, it is relevant to consider L2 cache bandwidth as an additional bound for query executions on GPUs and that compute-bound executions may be impacted by changes in compute resource allocations.

Figure 3:
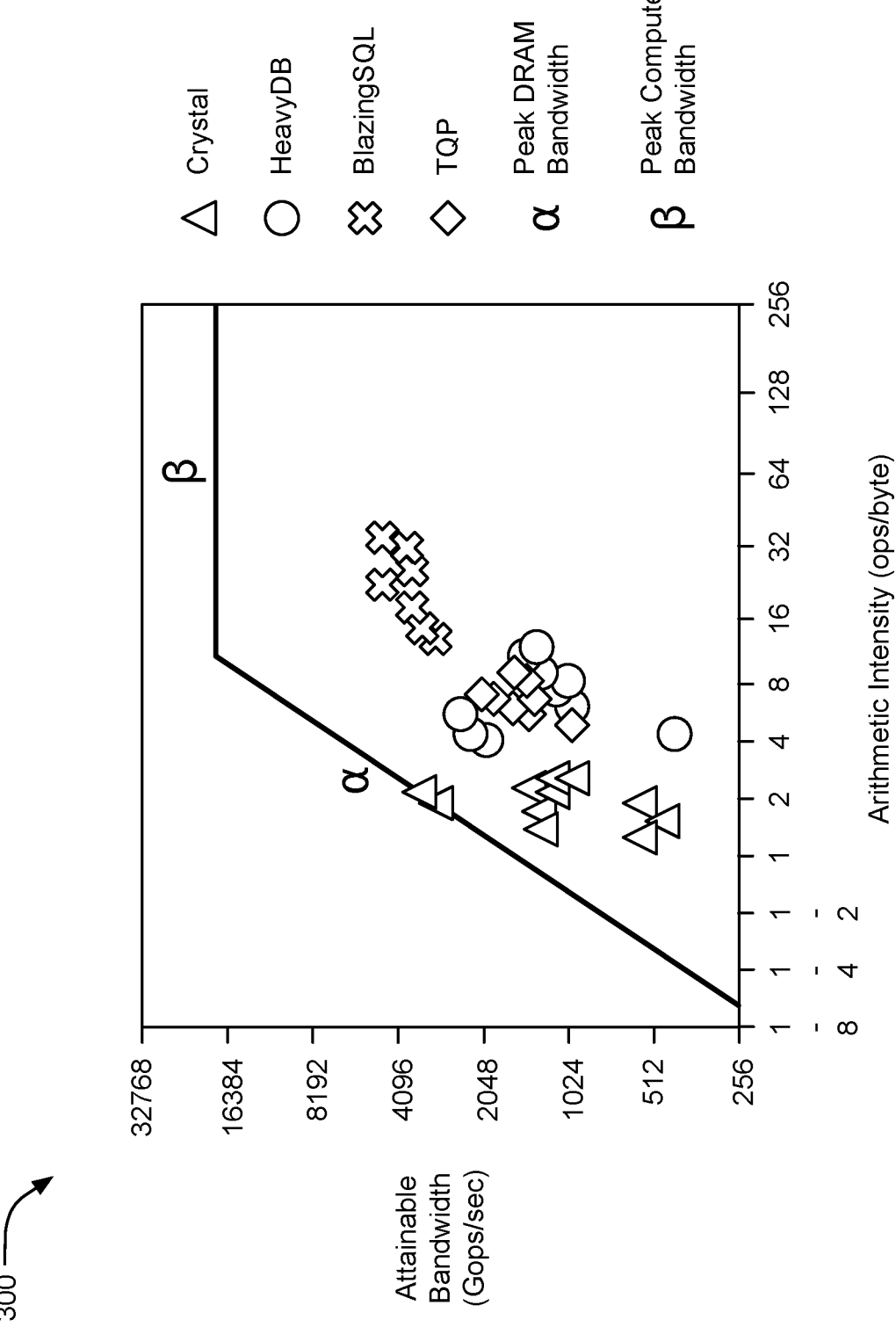
FIG. 3 shows performance modeling results in a DRAM roofline model in four example computing systems.

FIG. 3 shows performance modeling results 300 in a DRAM roofline model in four example computing systems (Crystal, HeavyDB, BlazingSQL, and TQP). The AI and attained throughput are derived from metrics described in Table 1 below. In Table 1, the peak integer operations performance substantially indicates the compute bandwidth ceiling. The theoretical GPU DRAM bandwidth is used for the DRAM bandwidth ceiling. It is noted that the GPU also has other functional units like the floating-point operations unit. However, because most OLAP (online analytical processing) queries may only require integer operations (although other OLAP queries may be modeled as floating point operations), describing the integer operation is sufficient to construct the roofline model. Nevertheless, the described technology can be applied to floating point-based queries as well as a mixture of different types of queries. It is also noted that each query can consist of multiple kernels, which are addressed by aggregate scalar values, such as the execution duration, total bytes, and total integer operation instructions. The aggregated values were then used to obtain the relevant values for the construction of the roofline model.

TABLE 1

| Metrics for Roofline Model (DRAM) | |
|---|---|
| Metric Name | Description |
| gpu___time__duration.sum | Execution duration |
| dram__bytes.sum | Total bytes from DRAM |
| smsp___sass__thread__inst__executed__op__integer__pred__on.sum.per__cycle__elapsed | Achieved Compute Bandwidth |
| sm___sass__thread__inst__executed__op__integer__pred__on.sum.peak__sustained | Peak Compute Bandwidth |

The Star Schema Benchmark (SSB) is a performance test set in a lightweight data warehouse scenario. Based on TPC-H, SSB provides a simplified version of the star schema dataset, which is mainly used to test the performance of multi-table association queries under the star schema. In computing, the star schema is the simplest style of data mart schema and is an approach widely used to develop data warehouses and dimensional data marts. The star schema consists of one or more fact tables referencing any number of dimension tables. The star schema is an important special case of the snowflake schema and is more effective for handling simpler queries.

The SSB benchmark has 13 queries in total. Each data point in FIG. 3 corresponds to the performance of a query from four systems. As shown in FIG. 3, the AI of Crystal, HeavyDB, and BlazingSQL are all relatively low. Especially for Crystal, three queries have already saturated the peak GPU DRAM bandwidth. Crystal implements the hash-join as a filter for these three queries. Filter operation simply runs a quick data scan, which more easily saturates the GPU DRAM bandwidth compared to hash-join. For other queries, they all have hash-join, which causes many random memory accesses to GPU DRAM, so their performances are still far from the peak GPU DRAM bandwidth. On the contrary, BlazingSQL is very compute-intensive compared to the other three systems. This proves that even simple OLAP queries can be very compute-intensive, depending on the query implementations from the system. Interestingly, BlazingSQL has the highest AI as well as operations/second (e.g., an example throughput metric). However, BlazingSQL and TQP load much more data than Crystal and HeavyDB. Consequently, they have more instructions to operate, so the eventual runtime of those two systems is higher.

Figure 4:
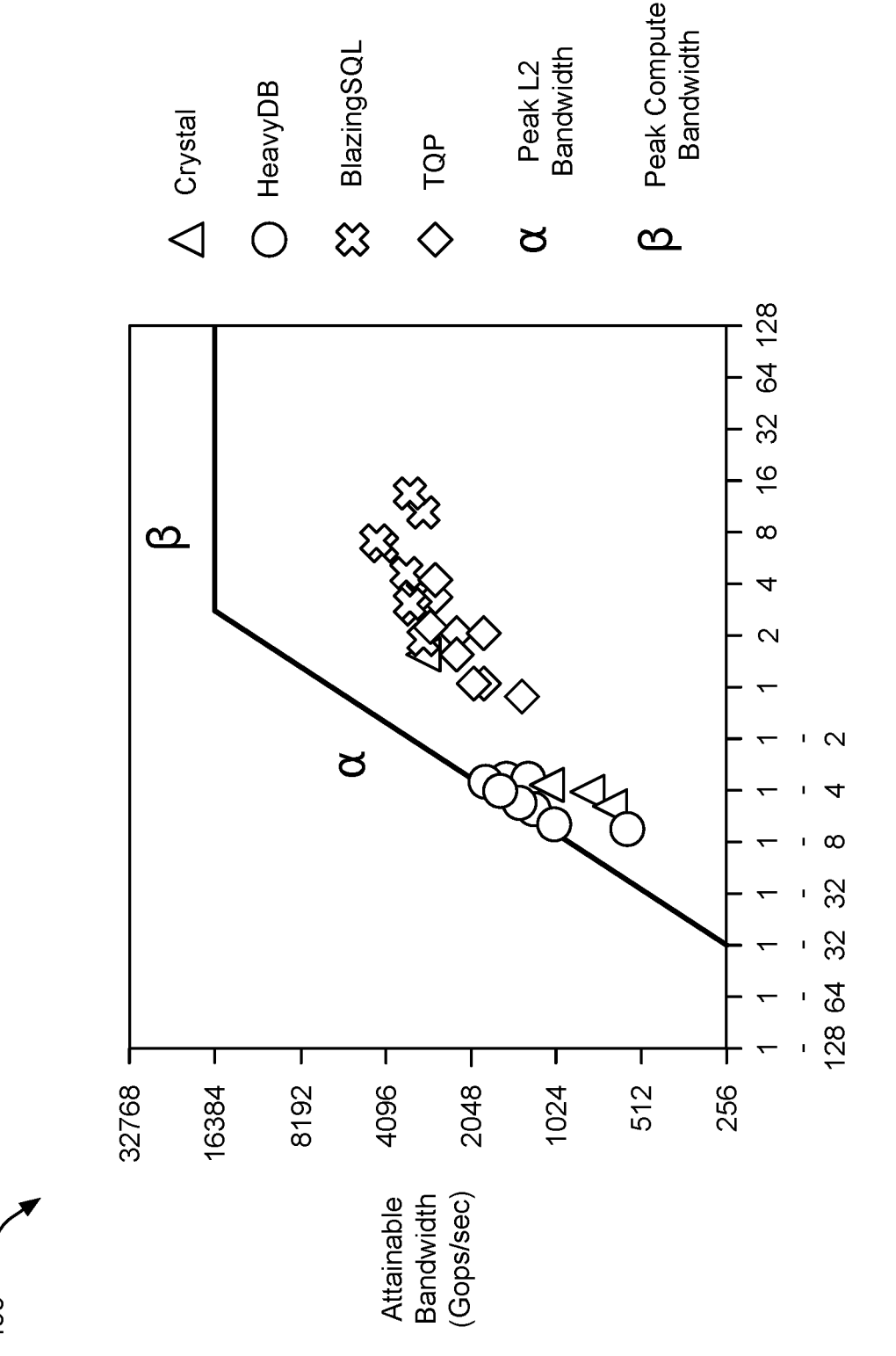
FIG. 4 shows performance modeling results in an L2 roofline model in four example computing systems.

FIG. 4 shows performance modeling results 400 in an L2 roofline model in four example computing systems (Crystal, HeavyDB, BlazingSQL, and TQP). GPU DRAM bandwidth is not the only resource constraint of query executions. Especially for very optimized systems like Crystal and HeavyDB, such systems can be bounded by other resources (e.g., L2 cache bandwidth). The AI of different resources is very different. For example, when a query has a very good L2 hit rate, most of the memory requests will be satisfied by the L2. So, the number of bytes loaded from the L2 cache will be high. As a result, the AI relative to the L2 cache is low. On the other hand, because there are fewer bytes loaded from the GPU DRAM, the AI is high with a fixed number of integer operation instructions. As such, separate roofline models can be used to characterize the same query regarding the different memory resources.

Most metrics profiled in Table 1, except possibly for the total bytes read from DRAM, can be used to construct the roofline model for the L2 cache. In addition, to estimate the bytes read from the L2, the number of L2 requests (shown in Table 2 below) that the kernel loads is profiled and multiplied with the cache line size per request (128 bytes).

TABLE 2

Metrics for Roofline Model (L2 Cache)

| Metric Name | Description |
| --- | --- |
| lts___t_requests_srcunit_tex_op_read.sum | Total requests to L2 cache |

FIG. 4 indicates that two systems (Crystal and HeavyDB) are very optimized—their performances are sometimes bounded by the L2 cache bandwidth. Nevertheless, for other systems like BlazingSQL and TQP, their implementations are still far from saturating the L2 cache bandwidth. In our experiment, we profile the same set of queries with the same SF=16 for both the DRAM and L2 cache roofline models.

Turning back to FIG. 3, it is shown that very few queries saturate the peak DRAM bandwidth. In contrast, in FIG. 4, the same queries on the L2 cache roofline model exhibit an AI drop. This is reasonable, especially in the case that queries have good utilization of the L2 cache bandwidth, because most memory requests complete at the L2 cache level, so the GPU has less data to handle at DRAM. A second observation is that many of those queries are actually bounded by the peak L2 cache bandwidth. Accordingly, the queries with hash-join are more likely to saturate the L2 cache bandwidth. A proposed reason is that the SSB benchmark has relatively small hash tables that are likely to fit into the L2 cache of a high-end GPU. Even though hash-join can cause random accesses, queries can still have a good L2 cache utilization due to the small working set size. On the other hand, queries with simple filtering are more likely to be bounded by the DRAM bandwidth. This is because there is minimal data reuse, but most data is streamed to the kernel, and cache utilization is generally lower.

FIG. 5 illustrates an example memory hierarchy 500 that may be employed in executing workloads, an example multi-instance GPU (MIG 502), and an example multi-process service (MPS 504). As shown in the memory hierarchy 500, kernel execution can access data stored in either shared memory or L1 cache. Shared memory is managed by the user, but the L1 cache is managed by the hardware. Each GPU core has a private L1 cache and shared memory region, but the L2 cache and DRAM are shared across all GPU cores. For example, the NVIDIA A100 GPU has a 40 MB L2 cache and 40 GB of DRAM. The memory hierarchy 500 is consistent for all NVIDIA GPUs currently available, but the specific values for capacity and bandwidth varies across GPUs.

The MIG 502 enables physical partitioning of GPU resources—SMs (streaming multiprocessors), L2 cache, DRAM capacity, and bandwidth, which can create full isolation between concurrent users. The MIG 502 shows an example of resource allocation through the MIG 502 to support two concurrent clients with equal allocation (1/2 GPU resources) in this example. The MIG 502 also supports heterogeneous resource partitions to meet the different needs of different clients. Currently, the finest resource allocation granularity that the MIG 502 supports is 1/7 of GPU resources, so it can support up to seven concurrent clients with isolated resources on the GPU. The MIG 502 currently offers a total of 18 choices for resource partitions on the NVIDIA A100. These characteristics and limitations may vary for different GPUs.

The MPS 504 can provide logical resource partitioning to support concurrent execution. In old generation GPUs, the MPS 504 only allows time-sharing of the GPU. Newer generations of the MPS 504 allow actual concurrent execution through lightweight resource partitioning by time-sharing SMs. In the MPS 504, the L2 cache and DRAM are still unified resources without any isolation. When the MPS 504 starts, it creates a resource scheduler 506 for the GPU.

Virtual GPU (vGPU) is another feature of some GPU technology that allows multiple clients to share a GPU. However, its main objective is to ensure security isolation between clients, so that malicious clients cannot monitor the activity of others. The way that GPU resources are allocated or partitioned still depends on the above-mentioned mechanisms. vGPU adds another layer of protection on the shared GPU.

A resource model, such as the roofline model, can be used to estimate the performance impact of changes in resource allocation, which can then be used to select the optimal configuration to execute a workload on a processing unit, such as a GPU. The resource model uses runtime statistical information that can be obtained from prior executions of recurring queries or by executing a representative workload.

Using DRAM as the target resource for illustration purposes, let t denote the query time under the current allocation and let Bandwidth$_{DRAM'}$ denote the new DRAM bandwidth. The new query time t' may be predicted by using the following equation:

$$t' = \max\left\{t, \frac{\text{\# of Integer Operations}}{AI_{DRAM} \times \text{Bandwidth}_{DRAM'}}\right\}$$

This equation is proposed based on the observation that AI is determined by the implementation of the query and is unlikely to change when the resource allocation changes. The resource model picks the maximum among the two terms in the equation—the first term for scenarios where DRAM bandwidth is not a bottleneck (and so, the time remains unchanged), and the second for scenarios where DRAM bandwidth is the bottleneck. For the latter case, the denominator in the fraction is the maximum throughput at the given AI and allocated DRAM bandwidth. In this case, the query time is the time to execute the total integer operations at that throughput. Similar equations can be applied to L2 bandwidth.

Example resource allocation instructions can direct the processing unit to physically allocate a portion of memory to execute the query, to logically allocate a portion of memory to execute the query, and/or to allocate all or a proper subset of processor cores in the processing unit to execute the query.

Figure 6:
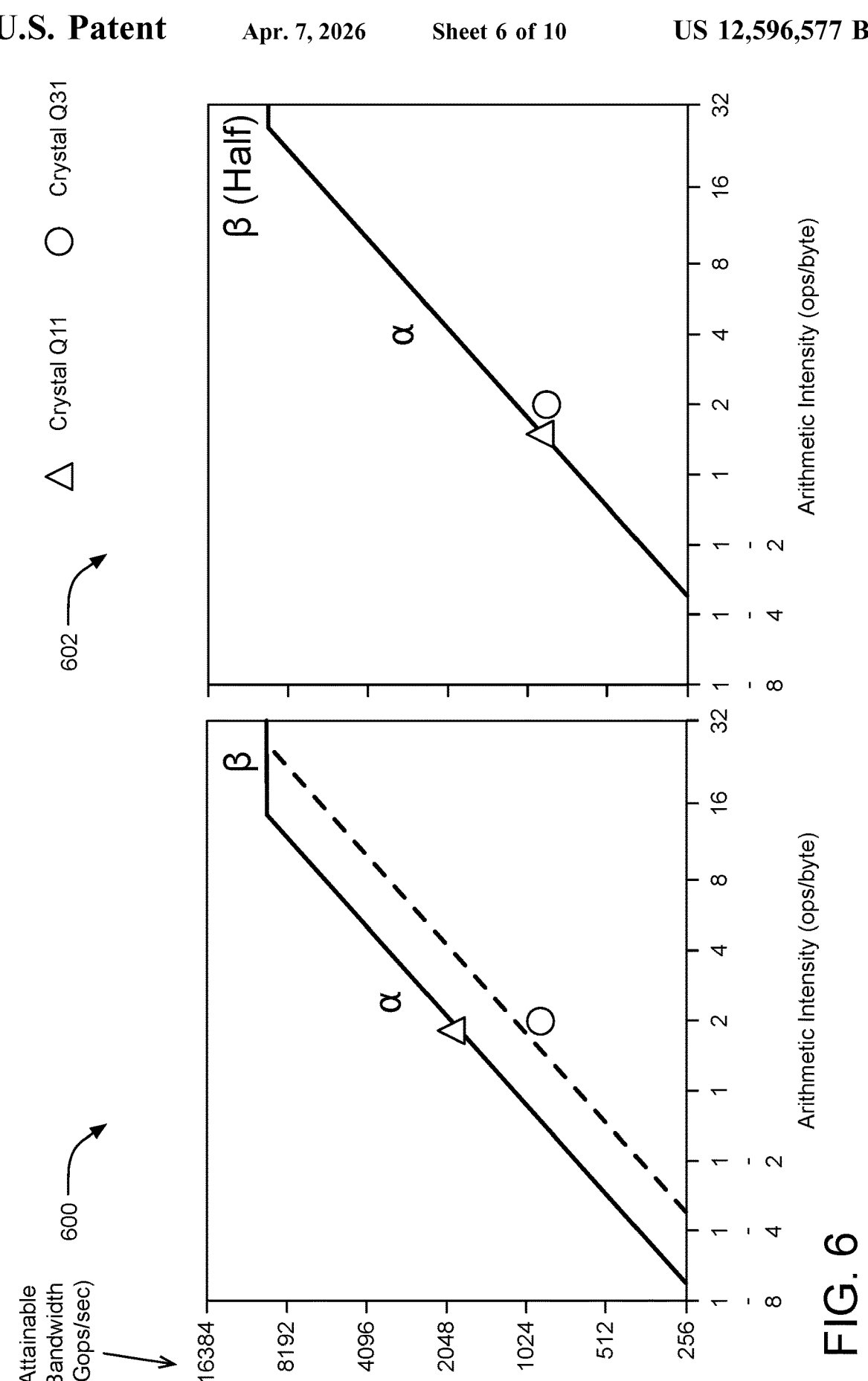
FIG. 6 illustrates scenarios using representative queries (Q11, Q31) from Crystal and a full-to-half DRAM allocation change.

FIG. 6 illustrates a scenario 600 and a scenario 602 using representative queries (Q11, Q31) from Crystal and a full-to-half DRAM allocation change. Q31 underutilizes the DRAM bandwidth and has no performance impact, whereas Q11 loses throughput (geometrically, the point shifts downwards) since it saturates the DRAM bandwidth. Finally, SlowdownDRAM=t'/t, the performance impact, is computed in the scenario 600, where DRAM bandwidth is not a bottleneck (and so, the time remains unchanged), and in the scenario 602 where half of the DRAM is allocated to the query execution and the DRAM bandwidth is a bottleneck.

As discussed, the most recent GPUs system support not only DRAM bandwidth partitioning but also L2 bandwidth partitioning. Similar to the above method, the performance impact due to changed L2 allocation can be determined using the L2 roofline model. One challenge is how to combine both DRAM and L2 roofline models into a unified model to estimate the query slowdown, which can be accomplished using a max function to provide the total slowdown estimation as follows:

$$\text{Slowdown}=\max\{\text{Slowdown}_{DRAM},\text{Slowdown}_{L2Cache}\} \quad \text{Equation (1)}$$

Note: The $\text{Slowdown}_{L2Cache}$ metric can be computed similarly to the $\text{Slowdown}_{DRAM}$ metric but using AI and Bandwidth for the L2Cache.

It has been discovered empirically that queries are rarely bottlenecked by both resources (L2 and DRAM). For example, if a query has a very high utilization of the L2 cache bandwidth (i.e., it is bottlenecked by the L2), it only generates minimal traffic to DRAM, so it will not be substantially affected by changes in DRAM bandwidth. Hence, one of the estimated slowdown terms is likely to be "1" (representing no slowdown). Thus, the max function yields the dominating slowdown value.

The same type of resource model can be used to estimate performance impact for more compute-intensive queries. In this case, because BlazingSQL has the most compute-intensive implementations compared to the other systems, BlazingSQL was selected as the example to illustrate this concept.

Figure 7:
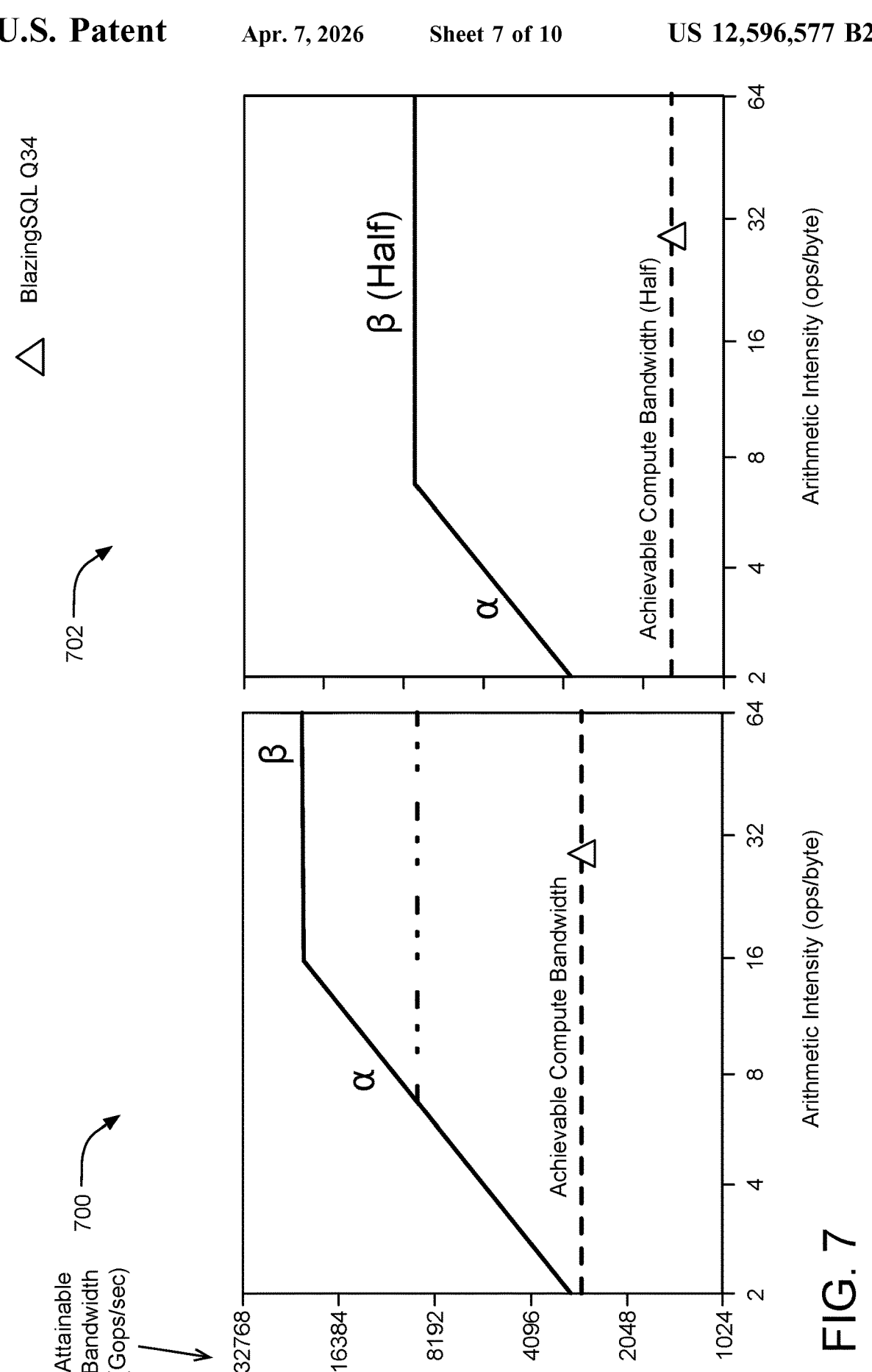
FIG. 7 illustrates a scenario and a scenario for a query Q34 attainable bandwidth (i.e., throughput) and AI (2886.74 Gops/sec and 27.15 ops/byte, respectively).

FIG. 7 illustrates a scenario 700 and a scenario 702 for a query Q34 attainable bandwidth (i.e., throughput) and AI (2886.74 Gops/sec and 27.15 ops/byte, respectively). The peak compute bandwidth of the full GPU is 18247.00 Gops/sec and that for half of GPU resources is near 9123.50 Gops/sec (dashed and dotted line in scenario 700). It is clear that even the peak compute bandwidth for half GPU is beyond the attainable bandwidth of Q34, so the traditional roofline model would predict no performance slowdown. Nevertheless, it is discovered that this is not the case due to the following reason: for every query, there is an actual achievable compute bandwidth=achievable bandwidth per SM×number of SMs on the GPU (dotted line in scenario 700), which is a much lower ceiling than the theoretical peak compute bandwidth. When the GPU allocates fewer compute resources, it reduces the number of SMs allocated, but it does not improve the execution efficiency (i.e., achievable compute bandwidth) of each SM. As a result, the overall achievable compute bandwidth will subsequently decrease (scenario 702). To estimate the resulting slowdown, a ratio of resource allocations is used as follows:

$$\text{Slowdown}_{Compute} = \left\{ \frac{1}{ComputeAllocationRatio} \right. \quad \text{Equation (2)}$$

For example, if the GPU compute resource is halved (ComputeAllocationRation=1/2), then the attainable bandwidth can be calculated as half of the original attainable bandwidth with full GPU resources.

Unified Model. Now that we have proposed two models for estimating slowdowns with changing allocations—one for memory resources and one for compute resources, the last step is to determine which model to use. A heuristic evaluation is used to determine whether an application is compute-intensive or memory-intensive. As shown below, it can be determined whether an application tends to be compute-intensive based on the AI and peak compute and DRAM bandwidths of the GPU.

Slowdown =

$$\begin{cases} \text{result of Equation (2),} & \text{if } AI_{DRAM} > \dfrac{\text{Bandwidth}_{Compute}}{\text{Bandwidth}_{DRAM}} \text{ or } AI_{L2Cache} > \\ & \dfrac{\text{Bandwidth}_{Compute}}{\text{Bandwidth}_{L2Cache}} \\ \text{result of Equation (1)} & \text{otherwise} \end{cases}$$

If the application is more compute-intensive, then the resource model to account for compute bandwidth reduction is applied. Otherwise, the resource model for DRAM or L2 cache bandwidth reduction is applied.

The resource model can be extended to estimate end-to-end performance impact for different degrees of concurrency, which can be used to determine the optimal concurrency for the best performance. In one aspect, the resource model can be used to evaluate CPU and constant overhead when executing a workload within a processing unit (e.g., a workload including one or more queries). In another aspect, not necessarily mutually exclusive with the first aspect, the resource model can be used to evaluate the end-to-end performance of workload execution.

To construct the resource model for evaluating CPU and constant overhead, additional overheads for query executions are considered. For CPU overheads, the resource model includes the overhead of query optimization and compilation. For some systems (e.g., HeavyDB, Blazing-SQL), even though the same query has already been optimized and compiled to a binary, each query invocation still introduces some constant overhead on the CPU side. For such systems, the impact these overheads have on query execution performance may be considered. There are at least two additional major overheads that can be considered—GPU setup overhead, which includes GPU context initialization and memory allocations, and data transfer overhead. Relevant systems cache tables on the GPU device for future query executions, so the data transfer overhead is also a one-time cost.

As previously discussed, the end-to-end query execution time for one process can be estimated using a resource model. When the system varies the resource, the resource model will adjust the query in-GPU execution time. Other overheads will remain unchanged. Now to consider the execution time from multiple concurrent processes, a max function is used in one implementation because the longest-running process will determine the end-to-end query execution time for concurrent executions.

$$\text{ExecTime}=\max\{\text{ExecTime}_{p}1,\text{ExecTime}_{p}2 \ldots \text{Exec-Time}_{p}n\}$$

The query scheduling can also be used to estimate query performance versus degree concurrency for MPS, although accounting for interference in access to the shared L2 cache and DRAM may be excluded in some implementations.

FIG. 8 illustrates example operations 800 for provisioning resources of a processing unit. A receiving operation 802 receives a workload that can include one or more queries, such as through a communication interface or a user interface. Another receiving operation 804 receives a resource model that characterizes attainable compute/memory bandwidth and arithmetic intensity based on the peak compute bandwidth and the peak memory bandwidth of the processing unit.

A predicting operation 806 predicts a performance impact on the execution of the workload that is attributable to a performance constraint of the processing unit for the workload according to the resource model. A determining operation 808 determines a resource allocation of the processing unit, based on the predicted performance impact. An instructing operation 810 instructs the processing unit to allocate the resources for processing the workload based on the determined resource allocation. An execution operation 812 executes the workload in the processing unit according to the determined workload allocation.

It should be understood that the predicted performance impact may be negative or positive with respect to a baseline or some previous execution. In some circumstances, an instruction for resource allocation may result in a slowdown in query execution (e.g., a negative performance impact). For example, a reduction in the amount of compute resources, DRAM, and/or L2 cache allocated to a query may slow down the query by lowering the compute and/or memory bandwidth available to the query. In other circumstances, an instruction for resource allocation may result in a speed-up in query execution (e.g., a positive performance impact). For example, an increase in the amount of compute resources, DRAM, and/or L2 cache allocated to a query may speed up the query by increasing the compute and/or memory bandwidth available to the query. By extension, reductions/increases in any execution resources are predictable using the appropriate resource model corresponding to a given query.

Figure 9:
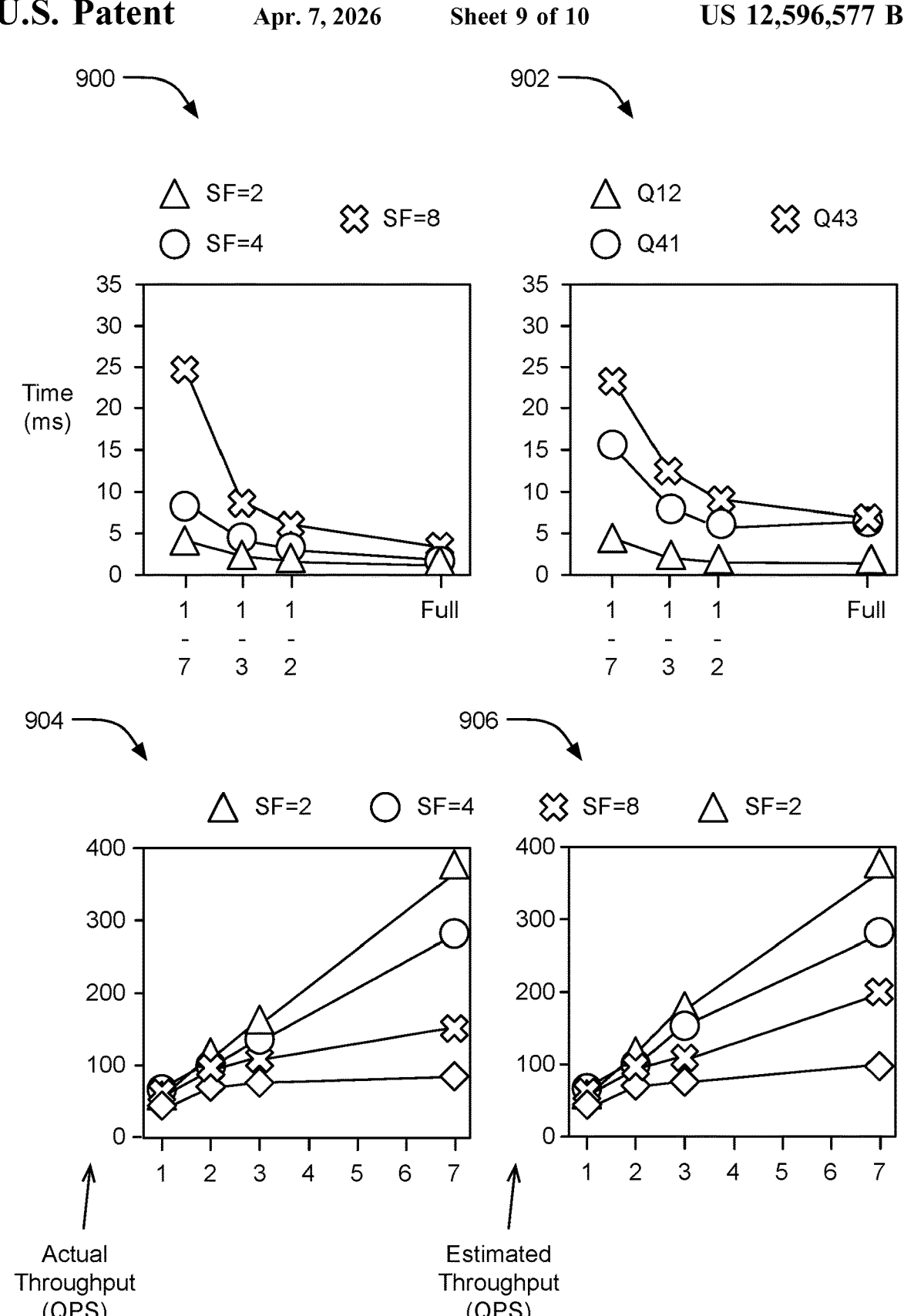
FIG. 9 illustrates various example comparisons of query execution times for different queries across multiple scale factors and example comparisons between actual throughput versus estimated throughput.

FIG. 9 illustrates various example comparisons of query execution times for different queries across multiple scale factors and example comparisons between actual throughput versus estimated throughput. A comparison 900 illustrates execution times of a query Q41 with different scale factors (SFs) versus GPU resource allocations (x-axis). A comparison 902 illustrates execution times of queries Q12, Q41, and Q43 with the same scale factor versus GPU resource allocations (x-axis).

A comparison 904 illustrates actual throughput versus the degree of concurrency (x-axis) across different scale factors. A comparison 906 illustrates estimated throughput (estimated by the described technology) versus the degree of concurrency (x-axis) across different scale factors.

Such visualizations may be presented in a graphical user interface to assist a user in setting or influencing the resource application instructions sent to a processing unit, such as a GPU.

Figure 10:
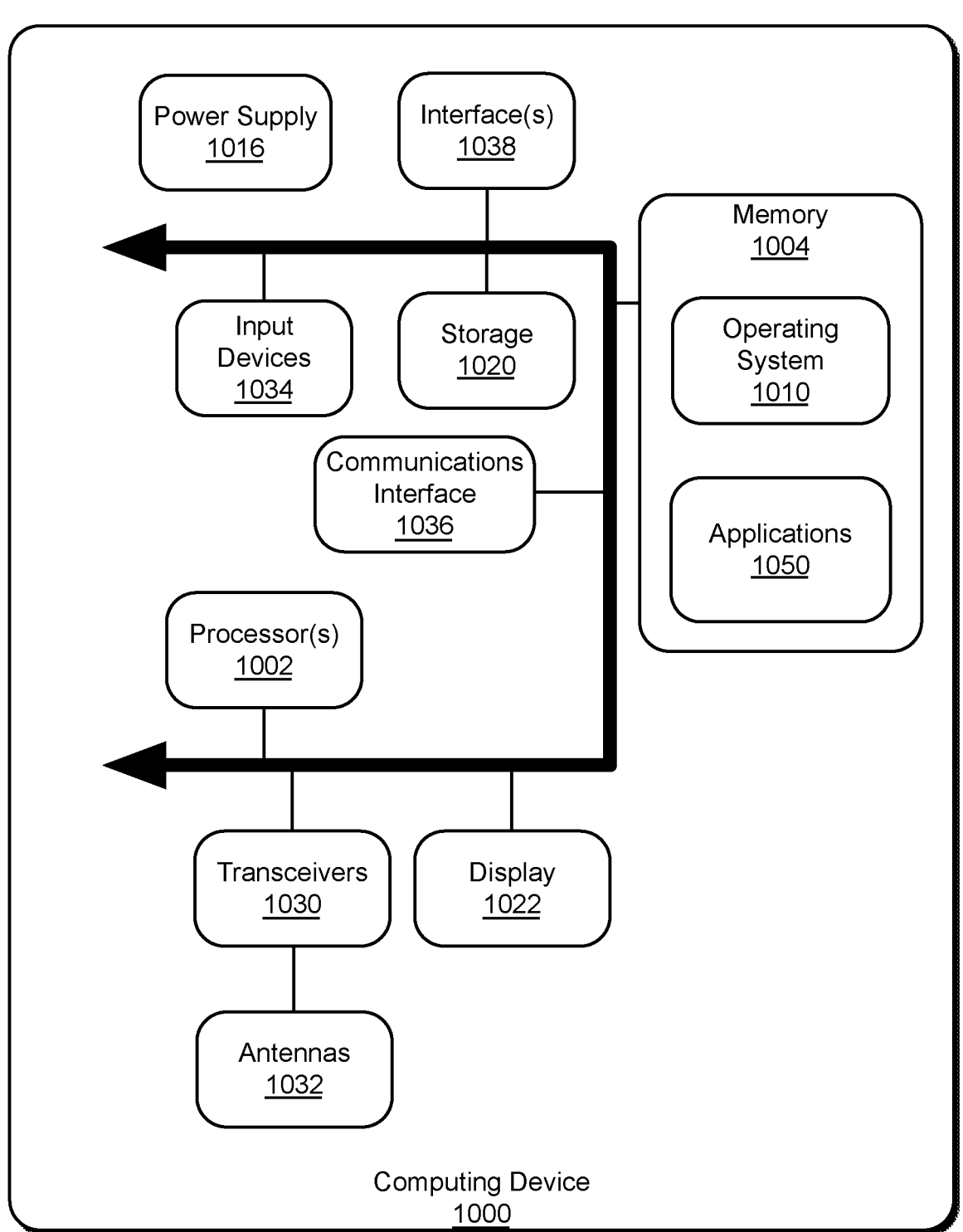
FIG. 10 illustrates an example computing device for implementing the features and operations of the described technology.

FIG. 10 illustrates an example computing device 1000 for implementing the features and operations of the described technology. The computing device 1000 may embody a remote-control device or a physically controlled device and is an example network-connected and/or network-capable device and may be a client device, such as a laptop, mobile device, desktop, tablet; a server/cloud device; an internet-of-things device; an electronic accessory; or another electronic device. The computing device 1000 includes one or more processor(s) 1002 and a memory 1004. The memory 1004 generally includes both volatile memory (e.g., RAM) and nonvolatile memory (e.g., flash memory). An operating system 1010 resides in the memory 1004 and is executed by the processor(s) 1002.

In an example computing device 1000, as shown in FIG. 10, one or more modules or segments, such as applications 1050, a user interface manager, a query manager, an opti-mizer and/or resource scheduler, a resource provisioner, a communication interface, and other modules are loaded into the operating system 1010 on the memory 1004 and/or storage 1020 and executed by processor(s) 1002. The storage 1020 may include one or more tangible storage media devices and may store a query, a workload, a resource model, compute metrics, DRAM metrics, cache (L1 or L2) metric, or other data and be local to the computing device 1000 or may be remote and communicatively connected to the computing device 1000.

The computing device 1000 includes a power supply 1016, which is powered by one or more batteries or other power sources and which provides power to other components of the computing device 1000. The power supply 1016 may also be connected to an external power source that overrides or recharges the built-in batteries or other power sources.

The computing device 1000 may include one or more communication transceivers 1030, which may be connected to one or more antenna(s) 1032 to provide network connectivity (e.g., mobile phone network, Wi-Fi®, Bluetooth®) to one or more other servers and/or client devices (e.g., mobile devices, desktop computers, or laptop computers). The computing device 1000 may further include a communications interface 1036 (e.g., a network adapter), which is a type of computing device. The computing device 1000 may use the communications interface 1036 and any other types of computing devices for establishing connections over a wide-area network (WAN) or local-area network (LAN). It should be appreciated that the network connections shown are examples and that other computing devices and means for establishing a communications link between the computing device 1000 and other devices may be used.

The computing device 1000 may include one or more input devices 1034 such that a user may enter commands and information (e.g., a keyboard or mouse). These and other input devices may be coupled to the server by one or more interfaces 1038, such as a serial port interface, parallel port, or universal serial bus (USB). The computing device 1000 may further include a display 1022, such as a touch screen display.

The computing device 1000 may include a variety of tangible processor-readable storage media and intangible processor-readable communication signals. Tangible processor-readable storage can be embodied by any available media that can be accessed by the computing device 1000 and includes both volatile and nonvolatile storage media, removable and non-removable storage media. Tangible processor-readable storage media excludes communications signals (e.g., signals per se) and includes volatile and nonvolatile, removable and non-removable storage media implemented in any method or technology for storage of information such as processor-readable instructions, data structures, program modules, or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage, or other magnetic storage devices, or any other tangible medium which can be used to store the desired information and which can be accessed by the computing device 1000. In contrast to tangible processor-readable storage media, intangible processor-readable communication signals may embody processor-readable instructions, data structures, program modules, or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals traveling through wired media such as a wired network or direct-wired connection, and wireless media such as acoustic, RF, infrared, and other wireless media.

Clause 1. A method of provisioning resources of a processing unit, the method comprising: predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; determining a resource allocation of the processing unit, based on the predicted performance impact; and instructing the processing unit to allocate the resources for processing the workload based on the determined resource allocation.

Clause 2. The method of clause 1, further comprising: executing the workload in the processing unit according to the determined resource allocation.

Clause 3. The method of clause 1, wherein the resource model includes a roofline model.

Clause 4. The method of clause 1, wherein the resource model includes a machine learning model trained on profiling data from previous query executions of a training workload, wherein the machine learning model is configured to predict run time on the query for different resource allocations of the processing unit.

Clause 5. The method of clause 1, wherein the resource allocation includes allocation of portions of DRAM of the processing unit to the query and allocation of portions of cache memory of the processing unit to the query.

Clause 6. The method of clause 1, wherein the resource allocation includes allocation of processor cores of the processing unit to the query.

Clause 7. The method of clause 1, wherein the predicted performance impact represents an estimated slowdown in processing the query on the processing unit between two different resource allocations applied to the query in the processing unit and determining the resource allocation comprises: selecting the resource allocation for the processing unit to use while processing the query based on predicted performance impact between the two different resource allocations.

Clause 8. A system for provisioning resources of a processing unit, the system comprising: one or more hardware processors; a performance analyzer executable by the one or more hardware processors and configured to predict a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; and a resource manager executable by the one or more hardware processor and configured to determine a resource allocation of the processing unit, based on the predicted performance impact and to instruct the processing unit to allocate the resources for processing the workload based on the determined resource allocation.

Clause 9. The system of clause 8, wherein the processing unit is configured to execute the workload according to the determined resource allocation.

Clause 10. The system of clause 8, wherein the resource model includes a roofline model.

Clause 11. The system of clause 8, wherein the resource model includes a machine learning model trained on profiling data from previous query executions of a training workload, wherein the machine learning model is configured to predict run time on the query for different resource allocations of the processing unit.

Clause 12. The system of clause 8, wherein the resource allocation includes allocation of portions of DRAM of the processing unit to the query and allocation of portions of cache memory of the processing unit to the query.

Clause 13. The system of clause 8, wherein the resource allocation includes allocation of processor cores of the processing unit to the query.

Clause 14. The system of clause 8, wherein the predicted performance impact represents an estimated slowdown in processing the query on the processing unit between two different resource allocations applied to the query in the processing unit and the resource manager is configured to determine the resource allocation by selecting the resource allocation for the processing unit to use while processing the query based on predicted performance impact between the two different resource allocations.

Clause 15. One or more tangible processor-readable storage media embodied with instructions for executing on one or more processors and circuits of a computing device a process for provisioning resources of a processing unit, the process comprising: predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; determining a resource allocation of the processing unit, based on the predicted performance impact; and instructing the processing unit to allocate the resources for processing the workload based on the determined resource allocation.

Clause 16. The one or more tangible processor-readable storage media of clause 15, wherein the process further comprises: executing the workload in the processing unit according to the determined resource allocation.

Clause 17. The one or more tangible processor-readable storage media of clause 15, wherein the resource model includes a roofline model.

Clause 18. The one or more tangible processor-readable storage media of clause 15, wherein the resource model includes a machine learning model trained on profiling data from previous query executions of a training workload, wherein the machine learning model is configured to predict run time on the query for different resource allocations of the processing unit.

Clause 19. The one or more tangible processor-readable storage media of clause 15, wherein the resource allocation includes allocation of portions of DRAM of the processing unit to the query, allocation of portions of cache memory of the processing unit to the query, or allocation of processor cores of the processing unit to the query.

Clause 20. The one or more tangible processor-readable storage media of clause 15, wherein the predicted performance impact represents an estimated slowdown in processing the query on the processing unit between two different resource allocations applied to the query in the processing unit and determining the resource allocation comprises: selecting the resource allocation for the processing unit to use while processing the query based on predicted performance impact between the two different resource allocations.

Clause 21. A system for provisioning resources of a processing unit, the system comprising: means for predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; means for determining a resource allocation of the processing unit, based on the predicted performance impact; and means for instructing the processing unit to allocate the resources for processing the workload based on the determined resource allocation.

Clause 22. The system of clause 21, further comprising: means for executing the workload in the processing unit according to the determined resource allocation.

Clause 23. The system of clause 21, wherein the resource model includes a roofline model.

Clause 24. The system of clause 21, wherein the resource model includes a machine learning model trained on profiling data from previous query executions of a training workload, wherein the machine learning model is configured to predict run time on the query for different resource allocations of the processing unit.

Clause 25. The system of clause 21, wherein the resource allocation includes allocation of portions of DRAM of the processing unit to the query and allocation of portions of cache memory of the processing unit to the query.

Clause 26. The system of clause 21, wherein the resource allocation includes allocation of processor cores of the processing unit to the query.

Clause 27. The system of clause 21, wherein the predicted performance impact represents an estimated slowdown in processing the query on the processing unit between two different resource allocations applied to the query in the processing unit and the means for determining the resource allocation comprises: means for selecting the resource allocation for the processing unit to use while processing the query based on predicted performance impact between the two different resource allocations.

Various software components described herein are executable by one or more processors, which may include logic machines configured to execute hardware or firmware instructions. For example, the processors may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Aspects of processors and storage may be integrated together into one or more hardware logic components. Such hardware-logic components may include field-programmable gate arrays (FPGAs), program- and application-specific integrated circuits (PASIC/ASICs), program-specific and application-specific standard products (PSSP/ASSPs), system-on-a-chip (SOC), and complex programmable logic devices (CPLDs), for example.

The terms "module," "program," and "engine" may be used to describe an aspect of a remote-control device and/or a physically controlled device implemented to perform a particular function. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service," as used herein, is an application program executable across one or multiple user sessions. A service may be available to one or more system components, programs, and/or other services. In some implementations, a service may run on one or more server computing devices.

While this specification contains many specific implementation details, these should not be construed as limitations on the scope of any technologies or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order or that all illustrated operations be performed to achieve desirable results. Furthermore, it should be understood that logical operations may be performed in any order, adding or omitting operations as desired, regardless of whether operations are labeled or identified as optional, unless explicitly claimed otherwise or a specific order is inherently necessitated by the claim language. In some cases, the actions recited in the claims can be performed in a different order and still achieve desirable results. In certain circumstances, multitasking and parallel processing may be advantageous. The logical operations making up implementations of the technology described herein may be referred to variously as operations, steps, objects, or modules.

Moreover, the separation of various system components in the implementations described above should not be understood as requiring such separation in all implementations, and it should be understood that the described program components and systems can generally be integrated together in a single software product or packaged into multiple software products. Thus, particular implementations of the subject matter have been described. Other implementations are within the scope of the following claims. Nevertheless, it will be understood that various modifications can be made without departing from the spirit and scope of the recited claims.

What is claimed is:

1. A method of provisioning resources of a processing unit, the method comprising:

predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit;

determining a resource allocation of the processing unit, based on the predicted performance impact; and instructing the processing unit to allocate the resources for processing the workload based on the determined resource allocation.

2. The method of claim 1, further comprising:

executing the workload in the processing unit according to the determined resource allocation.

3. The method of claim 1, wherein the resource model includes a roofline model.

4. The method of claim 1, wherein the resource model includes a machine learning model trained on profiling data from previous query executions of a training workload, wherein the machine learning model is configured to predict run time on the query for different resource allocations of the processing unit.

5. The method of claim 1, wherein the resource allocation includes allocation of portions of DRAM of the processing unit to the query and allocation of portions of cache memory of the processing unit to the query.

6. The method of claim 1, wherein the resource allocation includes allocation of processor cores of the processing unit to the query.

7. The method of claim 1, wherein the predicted performance impact represents an estimated slowdown in processing the query on the processing unit between two different resource allocations applied to the query in the processing unit and determining the resource allocation comprises:

selecting the resource allocation for the processing unit to use while processing the query based on the predicted performance impact between the two different resource allocations.

8. A system for provisioning resources of a processing unit, the system comprising:

memory;

one or more hardware processors;

a performance analyzer executable by the one or more hardware processors, stored in the memory, and configured to predict a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit; and a resource manager executable by the one or more hardware processor, stored in the memory, and configured to determine a resource allocation of the processing unit, based on the predicted performance impact and to instruct the processing unit to allocate the resources for processing the workload based on the determined resource allocation.

9. The system of claim 8, wherein the processing unit is configured to execute the workload according to the determined resource allocation.

10. The system of claim 8, wherein the resource model includes a roofline model.

11. The system of claim 8, wherein the resource model includes a machine learning model trained on profiling data from previous query executions of a training workload, wherein the machine learning model is configured to predict run time on the query for different resource allocations of the processing unit.

12. The system of claim 8, wherein the resource allocation includes allocation of portions of DRAM of the processing unit to the query and allocation of portions of cache memory of the processing unit to the query.

13. The system of claim 8, wherein the resource allocation includes allocation of processor cores of the processing unit to the query.

14. The system of claim 8, wherein the predicted performance impact represents an estimated slowdown in processing the query on the processing unit between two different resource allocations applied to the query in the processing unit and the resource manager is configured to determine the resource allocation by selecting the resource allocation for the processing unit to use while processing the query based on the predicted performance impact between the two different resource allocations.

15. One or more tangible processor-readable storage media embodied with instructions for executing on one or more processors and circuits of a computing device a process for provisioning resources of a processing unit, the process comprising:

predicting a performance impact on a workload attributable to a performance constraint of the processing unit for the workload according to a resource model, wherein the workload includes a query and the resource model characterizes attainable compute bandwidth, attainable memory bandwidth, and arithmetic intensity based on peak compute bandwidth and peak memory bandwidth of the processing unit;

determining a resource allocation of the processing unit, based on the predicted performance impact; and instructing the processing unit to allocate the resources for processing the workload based on the determined resource allocation.

16. The one or more tangible processor-readable storage media of claim 15, wherein the process further comprises:

executing the workload in the processing unit according to the determined resource allocation.

17. The one or more tangible processor-readable storage media of claim 15, wherein the resource model includes a roofline model.

18. The one or more tangible processor-readable storage media of claim 15, wherein the resource model includes a machine learning model trained on profiling data from previous query executions of a training workload, wherein the machine learning model is configured to predict run time on the query for different resource allocations of the processing unit.

19. The one or more tangible processor-readable storage media of claim 15, wherein the resource allocation includes allocation of portions of DRAM of the processing unit to the query, allocation of portions of cache memory of the processing unit to the query, or allocation of processor cores of the processing unit to the query.

20. The one or more tangible processor-readable storage media of claim 15, wherein the predicted performance impact represents an estimated slowdown in processing the query on the processing unit between two different resource allocations applied to the query in the processing unit and determining the resource allocation comprises:

selecting the resource allocation for the processing unit to use while processing the query based on the predicted performance impact between the two different resource allocations.

* * * * *